United States Patent
Rofka et al.

(10) Patent No.: US 9,500,127 B2
(45) Date of Patent: Nov. 22, 2016

(54) POWER PLANT AND METHOD FOR ITS OPERATION

(75) Inventors: Stefan Rofka, Nussbaumen (CH); Frank Sander, Rieden (CH); Eribert Benz, Birmenstorf (CH); Felix Güthe, Basel (CH); Dragan Stankovic, Nussbaumen (CH)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 1188 days.

(21) Appl. No.: 13/272,677

(22) Filed: Oct. 13, 2011

(65) Prior Publication Data

US 2012/0090327 A1   Apr. 19, 2012

(30) Foreign Application Priority Data

Oct. 19, 2010   (EP) ..................................... 10188026

(51) Int. Cl.
| F23C 9/00 | (2006.01) |
| F02C 3/34 | (2006.01) |
| F02C 6/18 | (2006.01) |
| F01K 17/04 | (2006.01) |

(Continued)

(52) U.S. Cl.
CPC ................. F02C 3/34 (2013.01); F01K 17/04 (2013.01); F01K 23/10 (2013.01); F02C 6/003 (2013.01); F02C 6/18 (2013.01); F02C 9/50 (2013.01); F05D 2260/61 (2013.01); F05D 2270/083 (2013.01); F05D 2270/3061 (2013.01); Y02E 20/16 (2013.01)

(58) Field of Classification Search
CPC ............... F02C 3/34; F02C 6/18; F23C 9/00

USPC .............. 60/39.52, 803, 39.17, 39.5, 39.182, 60/39.465

See application file for complete search history.

(56) References Cited

U.S. PATENT DOCUMENTS 4,271,664 A *  6/1981 Earnest ...................... 60/39.181
6,202,400 B1 *  3/2001 Utamura et al. ................ 60/773

(Continued)

FOREIGN PATENT DOCUMENTS

| JP | 2005515358 A | 5/2005 |
| JP | 2010065694 A | 3/2010 |

(Continued)

OTHER PUBLICATIONS

Office Action (Notification of Reasons for Refusal) issued on Sep. 8, 2014, by the Japanese Patent Office in corresponding Japanese Patent Application No. 2011-28775, and an English Translation of the Office Action. (16 pages).

(Continued)

*Primary Examiner* — Andrew Nguyen
(74) *Attorney, Agent, or Firm* — Buchanan Ingersoll & Rooney PC

(57) ABSTRACT

The power plant includes a gas turbine unit adapted to feed flue gases into a diverter where they are divided into a recirculated flow and a discharged flow. The recirculated flow is fed into a mixer together with fresh air to form a mixture that is fed to the gas turbine unit. The gas turbine unit includes a combustion chamber where a fuel is burnt together with the mixture. A control unit is provided, that is supplied with information regarding the fuel C2+ and/or $H_2$ content and is connected to at least the diverter to drive it and online regulate the recirculated flow mass flow rate in relation to the fuel C2+ and/or $H_2$ content.

16 Claims, 3 Drawing Sheets

(51) Int. Cl.
  *F01K 23/10* (2006.01)
  *F02C 6/00* (2006.01)
  *F02C 9/50* (2006.01)

(56) References Cited

U.S. PATENT DOCUMENTS

| | | | |
|---|---|---|---|
| 6,363,709 B2* | 4/2002 | Kataoka et al. | 60/775 |
| 7,489,835 B1* | 2/2009 | Xia et al. | 385/12 |
| 2004/0179937 A1* | 9/2004 | Kreis et al. | 415/170.1 |
| 2006/0174630 A1 | 8/2006 | Hellet et al. | |
| 2007/0084209 A1* | 4/2007 | Nigro | 60/772 |
| 2008/0076080 A1* | 3/2008 | Hu et al. | 431/9 |
| 2010/0058758 A1* | 3/2010 | Gilchrist et al. | 60/605.2 |
| 2010/0300110 A1* | 12/2010 | Kraemer et al. | 60/780 |

FOREIGN PATENT DOCUMENTS

| | | |
|---|---|---|
| JP | 2010530490 A | 9/2010 |
| WO | 2008155242 A1 | 12/2008 |
| WO | 2009/098128 A1 | 8/2009 |
| WO | 2010072710 A2 | 7/2010 |

OTHER PUBLICATIONS

Japanese Office Action issued in corresponding Japanese Patent Application No. 2011-228775 dated Oct. 13, 2015.

* cited by examiner

POWER PLANT AND METHOD FOR ITS OPERATION

RELATED APPLICATION

The present application hereby claims priority under 35 U.S.C. Section 119 to European Patent application number 10188026.8, filed Oct. 19, 2010, the entire contents of which are hereby incorporated by reference.

FIELD OF INVENTION

The present invention relates to a power plant and a method for its operation.

BACKGROUND

WO 2010/072710 discloses (FIG. 1) a power plant having a gas turbine unit 1 that comprises a compressor 2, a combustion chamber 3 and a turbine 4.

A mixture 6 comprising fresh air 7 coming from the environment is fed into the compressor 2 and flue gases 8 (deriving from the combustion of the mixture 6 with a fuel within the combustion chamber 3) emerge from the turbine 4.

These flue gases 8 (that typically have a high temperature) are fed into a boiler 9 of a steam turbine unit 10; within the boiler 9 the flue gases 8 transfer heat to water of the steam unit 10.

From the boiler 9, the flue gases 8 are supplied into a diverter 11, to be splitted into a recirculated flow 12 and a discharged flow 13.

The recirculated flow 12 is cooled in a cooler 14 and supplied via a fan 15 into a mixer 16, to be mixed with the fresh air 7 and form the mixture 6 that is fed into the compressor 2.

The discharged flow 13 is cooled in a cooler 19 and is then fed, via a fan 20, into a $CO_2$ capture unit 21 to be then discharged into the atmosphere via 22; in contrast the $CO_2$ that is captured in the $CO_2$ capture unit 21 is stored in 24.

During operation, from the one side it is advantageous to have a large recirculated flow 12, since this reduces the discharged flow 13 and increases the discharged flow $CO_2$ concentration and, therefore, it reduces the plant and operating costs (in particular with reference to the $CO_2$ capture unit 21); from the other side it is advantageous to have low recirculated flow 12, since this increases the oxygen content in the combustion chamber 3 and improves combustion.

Therefore the amount of recirculated flow is determined by an optimisation process that balances these opposing needs.

The combustion chamber 3 of the gas turbine unit 1 is known to have a plurality of mixing devices 25 connected to a combustion device 26.

The fuel 27 is injected into the mixing devices 25 such that it mixes with the flue gases/fresh air mixture 6 to then burn.

It is clear that combustion chambers 3 (i.e. their mixing devices 25 and combustion device 26) must be designed such that at the design operating conditions (including for example recirculated flow mass flow rate, fuel composition, temperature) a design fuel only burns when it moves out of the mixing devices 25 and enters the combustion device 26, because combustion in the mixing devices 25 (so-called flashback) is very detrimental for the service life of the combustion chamber.

For this reason, when the combustion chamber 3 is designed to operate with a given fuel at given conditions, a change of the fuel may not be possible or may require the operating conditions to be changed and adapted to the features of the actual fuel being used.

Typically combustion chambers are designed for operation with a gaseous fuel (typically "standard" natural gas, i.e. natural gas of a given composition) having given features.

Nevertheless, during operation it is often necessary to switch from a fuel having design features to a different fuel having different features.

In case one of these fuels has a high or very high reactivity, it can start to burn immediately after its injection into the mixing device (i.e. before it enters the combustion device), causing flashback.

For example, natural gas is a mixture of gas containing methane ($CH_4$), ethane ($C_2H_6$), propane ($C_3H_8$) butane ($C_4H_{10}$) etc and, in some cases, also $H_2$.

The content of ethane ($C_2H_6$)+propane ($C_3H_8$)+butane ($C_4H_{10}$)+etc defines the C2+ (usually in mol fraction), in other words the C2+ content is the mol fraction of higher alkane species within the fuel (gaseous fuel).

When the composition of the natural gas varies (for example the amount of the C2+ and/or $H_2$ increases when compared to the standard natural gas) its reactivity also varies and can greatly increase.

In these cases, when switching from standard natural gas to high reactive gas, the simple change of fuel would cause the new fuel to start to burn in the mixing devices 25 instead of the combustion device 26 (flashback).

To prevent this, traditionally the combustion chambers 3 are operated at a lower temperature (i.e. the flame temperature is reduced), such that the reactivity (that depends on a number of factors and also on temperature) decreases to a value allowing the fuel to correctly mix, pass through the whole mixing devices 25 and enter the combustion device 26, before it starts to burn.

In addition, also in case no fuel switch is foreseen, in some cases the features of the fuel being used may vary during operation; for example, in case natural gas is used, its C2+ and/or $H_2$ content (and consequently its reactivity) may vary during operation.

Also in this case, in order to allow a correct operation and to prevent fuel combustion within the mixing devices (flashback), the combustion chamber is traditionally operated at a lower temperature than the design temperature, to guarantee a safety margin from flashback.

It is nonetheless clear that such an operation with reduced combustion temperature inevitably causes a loss of power and reduction of performances and efficiency.

In addition, in particular when the $H_2$ content is large, the fuel is diluted (in some cases up to 50% or more). Such a large dilution can cause problems at the fuel supply circuit (in particular injectors and pumps), since the flow to be actually treated is much larger that the design flow.

SUMMARY

The present disclosure is directed to a method for operating a power plant including a gas turbine unit adapted to feed flue gases into a diverter where they are divided into a recirculated flow and a discharged flow. The recirculated flow is fed into a mixer together with fresh air to form a mixture that is fed to the gas turbine unit. The gas turbine unit includes at least one combustion chamber where a fuel is burnt together with the mixture. The method includes, regulating online a mass flow rate of the recirculated flow in relation to a C2+ and/or H2 content of the fuel.

The disclosure is also directed to a power plant including a gas turbine unit adapted to feed flue gases into a diverter where they are divided into a recirculated flow and a discharged flow. The recirculated flow is fed into a mixer together with fresh air to form a mixture that is fed to the gas turbine unit. The gas turbine unit includes at least one combustion chamber where a fuel is burnt together with the mixture. The plant further includes a control unit that is supplied with information regarding a C2+ and/or $H_2$ content of the fuel and is connected to at least the diverter to drive it and online regulate a mass flow rate of the recirculated flow in relation to the fuel C2+ and/or $H_2$ content.

BRIEF DESCRIPTION OF THE DRAWINGS

Further characteristics and advantages of the invention will be more apparent from the description of a preferred but non-exclusive embodiment of the power plant and method illustrated by way of non-limiting example in the accompanying drawings, in which.

DETAILED DESCRIPTION OF THE PREFERRED EMBODIMENTS

Introduction to the Embodiments

Figure 1:
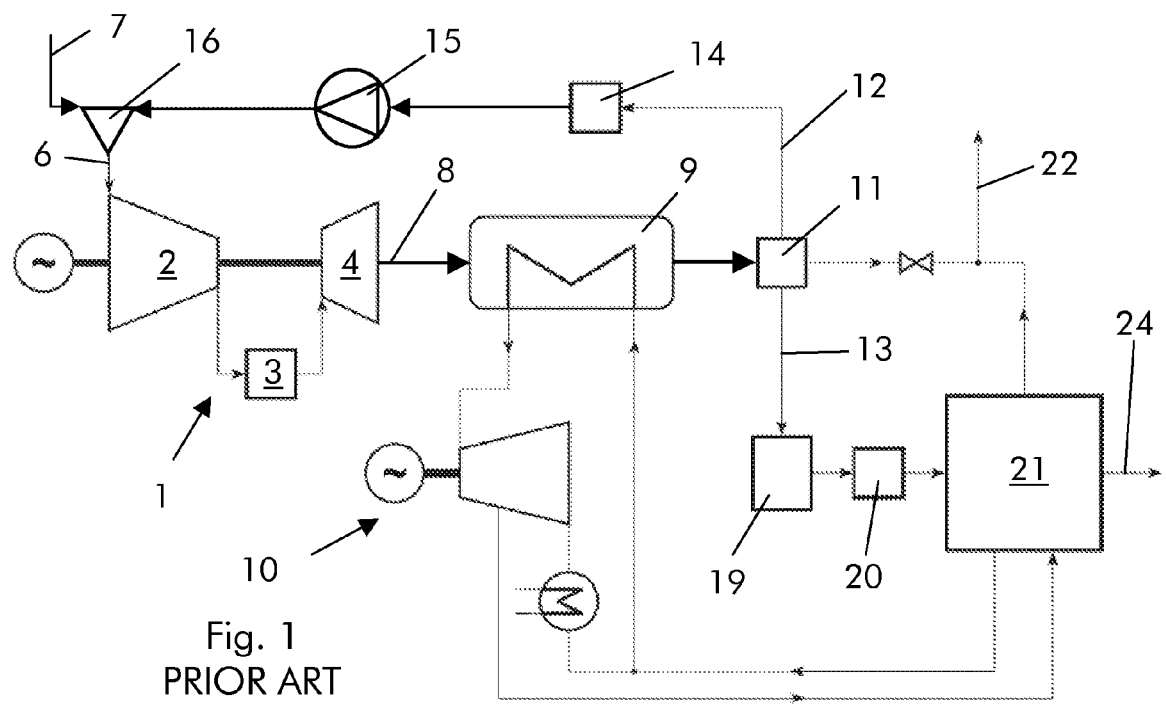
FIG. 1 is a schematic view of a traditional power plant.
Figure 2:
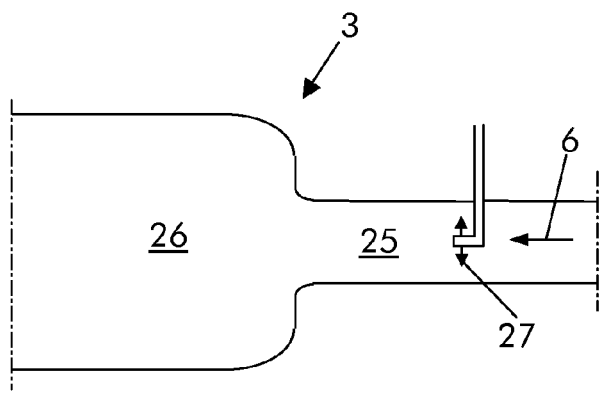
FIG. 2 is a schematic view of a combustion chamber.

The technical aim of the present invention therefore includes providing a power plant and a method addressing the aforementioned problems of the known art.

Within the scope of this technical aim, an aspect of the invention is to provide a power plant and a method allowing operation of a combustion chamber using a fuel having a C2+ and/or $H_2$ content different from that of a reference fuel (and thus a higher reactivity than a reference reactivity), without the need of reducing the combustion chamber temperature or with a limited need of such a reduction that negatively affects the plant power and efficiency.

Another aspect of the invention is to provide a power plant and a method allowing operation of a combustion chamber using a fuel with low dilution or no dilution at all, in particular for fuel rich in $H_2$.

The technical aim, together with these and further aspects, are attained according to the invention by providing a power plant in accordance with the accompanying claims.

DETAILED DESCRIPTION

With reference to the figures, a power plant is shown particularly adapted to operate with fuels having different features, such as a different C2+ and/or $H_2$ content, which cause a different reactivity. In addition, the features and the C2+ and/or $H_2$ content (thus the reactivity) may also change during operation (i.e. without a power plant stoppage). For sake of clarity like references designate identical or corresponding parts throughout all the several views.

The power plant comprises a gas turbine unit 1 whose flue gases 8 are preferably supplied into a boiler 9 of a steam turbine unit 10 and are then fed into a diverter 11, where they are divided into a recirculated flow 12 and a discharged flow 13.

The recirculated flow 12 passes through a cooler 14 and a fan 15 to then enter a mixer 16 together with fresh air 7 to form a mixture 6 that is fed to the gas turbine unit 1.

The discharged flow 13 is supplied into a $CO_2$ capture unit 21 via a cooler 19 and a fan 20 and is then discharged in the environment via 22; the $CO_2$ collected in the $CO_2$ capture unit 21 is then stored in 24.

As known, the gas turbine unit 1 comprises (FIG. 3) a compressor 2, wherein the mixture 6 is fed to be compressed, a combustion chamber 3 wherein a fuel 27 (for example natural gas) is supplied into the compressed mixture 6 and combusted, and a turbine 4 wherein the flue gases generated in the combustion chamber 3 are expanded and mechanical power is gathered, for example to activate an electric generator 28.

In addition, the gas turbine unit 1 comprises a control unit 30 that is supplied with information regarding the fuel C2+ and/or $H_2$ content and is connected to the diverter 11, to drive it and online regulate the recirculated flow 12 mass flow rate in relation to the fuel C2+ and/or $H_2$ content.

Alternatively (FIG. 4) the power plant has the gas turbine unit 1 with a compressor 2, a first combustion chamber 3a and, downstream of it, a high pressure turbine 4a, a second combustion chamber 3b that is fed with the flue gases partially expanded in the high pressure turbine 4a, and a low pressure turbine 4b that is fed with the flue gases generated in the second combustion chamber 3b.

In this embodiment, in case the first and the second combustion chamber 3a, 3b are supplied with the same fuel, the control unit 30 regulates the recirculated flow 12 mass flow rate in relation to the C2+ and/or $H_2$ content of this fuel.

In case the fuels used to feed the combustion chambers 3a, 3b are different, the control unit 30 may use the C2+ and/or $H_2$ content of the fuel supplied either into the first or second combustion chamber 3a, 3b as a reference to regulate the recirculated flow 12 mass flow rate; in general the C2+ and/or $H_2$ content (thus the reactivity) of both fuels must be monitored.

In a first embodiment, the information regarding the fuel C2+ and/or $H_2$ content can be provided to the control unit 30 when use of a particular fuel starts. This is particularly useful when the fuel composition is constant or substantially constant.

Alternatively, in a preferred embodiment sensors 31 for continuously online measuring the fuel C2+ and/or $H_2$ content are provided (for example this can be achieved by chromatography); the sensors 31 are connected to the control unit 30 that continuously online regulate the recirculated flow 12 mass flow rate.

In this respect, the control unit 30 can advantageously include a computer implementing a look-up, or reference, table 33 (FIG. 5) associating the fuel C2+ and/or $H_2$ content FCC to the flue gas recirculation ratio FGR (the flue gas recirculation ratio being the ratio between the recirculated flow 12 typically downstream of the cooler 14 (where water could condensate) and the flue gases 8 at the gas turbine unit outlet).

Figure 5:
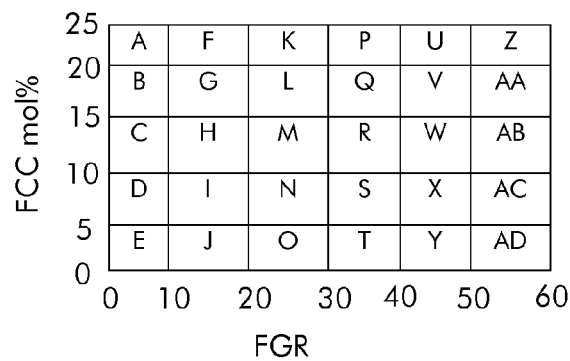
FIG. 5 shows a look-up table.

In particular the look-up table 33 of FIG. 5 defines the relationship between the FGR (flue gas recirculation ratio) and the FCC (fuel C2+ content) for different temperatures at the combustion chamber outlet, i.e. values A . . . indicate the operating temperature (either as an absolute value or as a differential value with respect to the temperature when the combustion chamber operates with a reference fuel) for a given FCC and FGR; thus, for example, in case a fuel with C2+ content between 10-15 mol % is used, the gas turbine unit can be operated with combustion chamber at temperature C or H or M or R or W or AB according to the actual FGR. Similar look up tables can also be prepared in case $H_2$ content is to be monitored or also when C2+ and $H_2$ contents are to be monitored at the same time.

Figure 3:
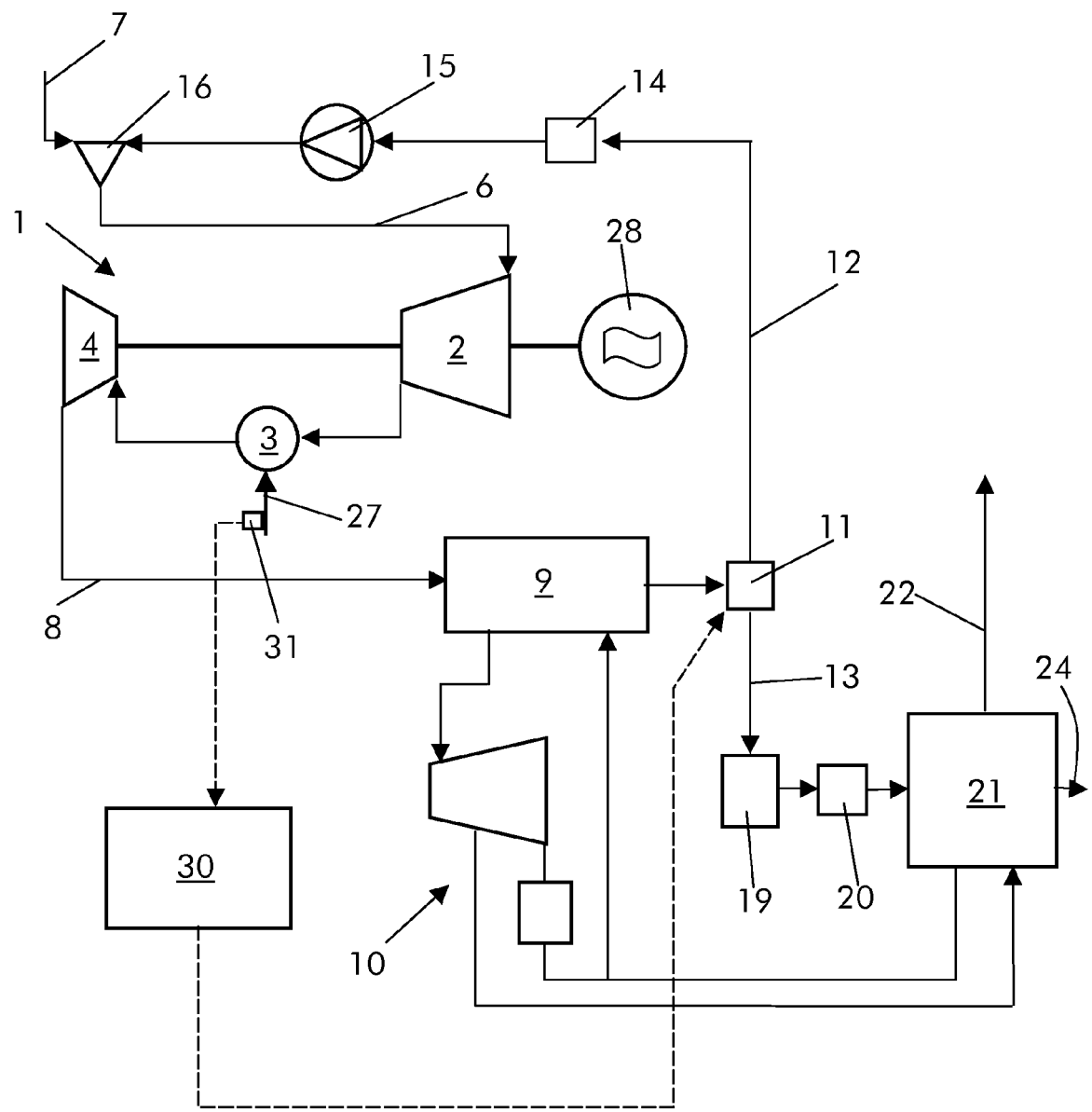
FIGS. 3 and 4 are schematic views of power plants in two different embodiments of the invention.
Figure 4:
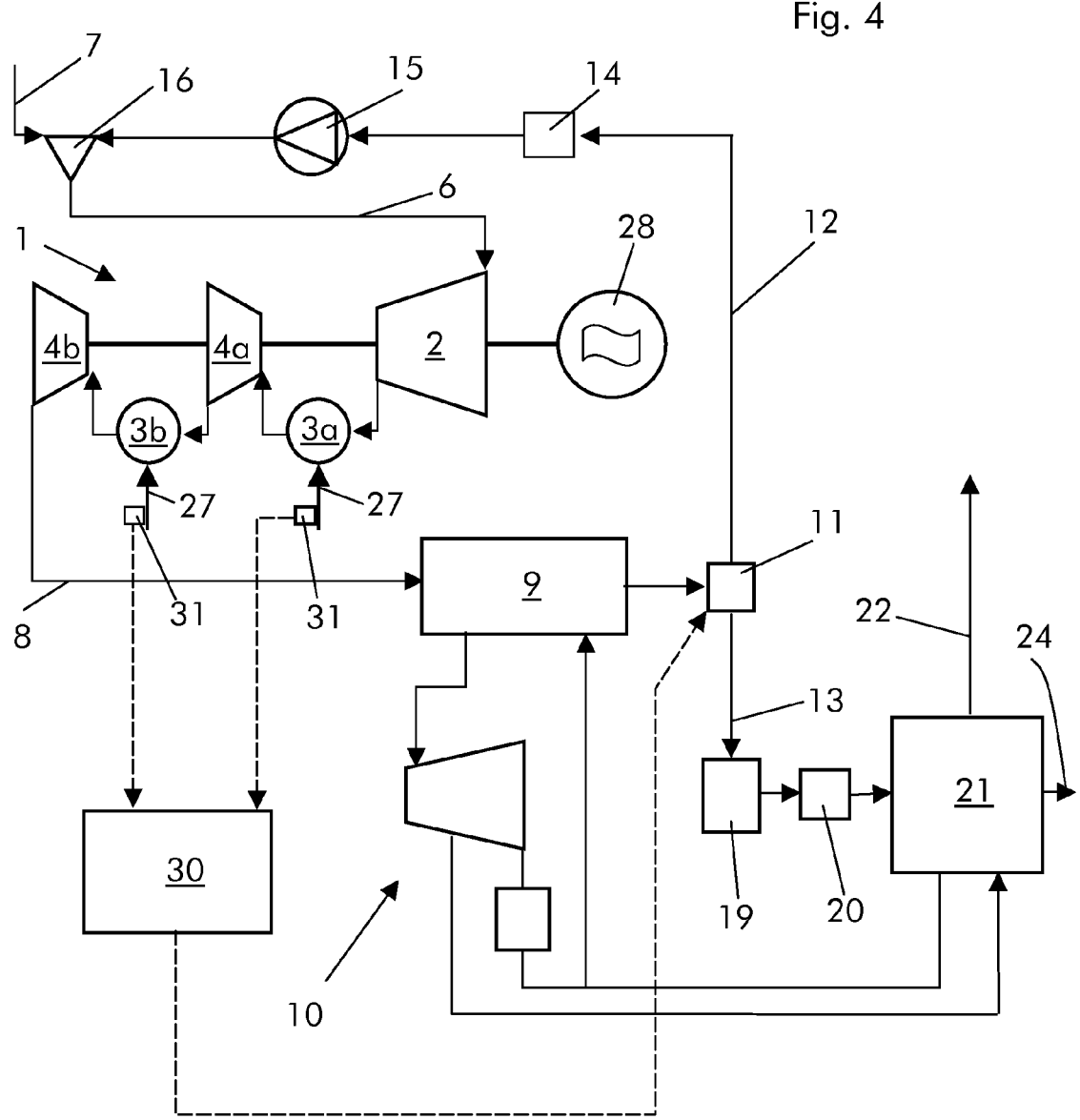

The operation of the power plant is apparent from that described and illustrated and is substantially the following (with reference to FIG. 3; operation of the power plant of FIG. 4 is evident and thus not described in detail).

Mixture 6, supplied at the gas turbine compressor 2, is mixed with fuel and combusted in the combustion chamber 3; the flue gases are then expanded in the turbine 4.

The sensors 31 continuously measure the C2+ and/or $H_2$ content of the fuel (typically natural gas) and provide this information to the control unit 30; on the basis of this information the control unit 30 determines the correct FGR for that particular fuel having that particular C2+ and/or $H_2$ content (for example using look-up table 33) and drives the diverter 11 accordingly.

Since reactivity depends on a number of different factors such as fuel temperature and composition (i.e. fuel C2+ and/or $H_2$ content), oxygen concentration, etc, controlling the FGR (and thus the oxygen content within the mixture 6, since the higher the FGR, the higher the $CO_2$ and the lower the $O_2$ within the mixture 6) on the basis of the flue C2+ and/or $H_2$ content allows the fuel reactivity to be also controlled and set in order to avoid any flashback risk, even if the fuel C2+ and/or $H_2$ content is high or very high.

In addition, since the flashback risk is reduced, the dilution (in particular in case the $H_2$ content is high) can be reduced or also avoided.

Different operating modes are possible. In a first operating mode the FGR can be regulated such that the temperature at the combustion chamber outlet is the same as the temperature when the fuel used as a reference for designing the combustion chamber is used (design temperature, operation occurs at design combustion chamber outlet temperature).

In this case, the power plant can be operated with a fuel having a high C2+ and/or $H_2$ content (higher that the design C2+ and/or $H_2$ content) without reducing the temperature at the combustion chamber outlet; therefore power and performances are not reduced because a fuel with a high C2+ and/or $H_2$ content is used.

Alternatively, the temperature at the combustion chamber outlet may also be increased with respect to the temperature with the reference fuel. In this case, the temperature increase causes a reactivity increase that is compensated for by a reduced oxygen concentration (that causes the reactivity to decrease) in the combustor zone housing the fuel that is in turn achieved by increasing the FGR.

If the power plant has a gas turbine unit with a first and a second combustion chamber 3a, 3b into which the flue gases from the first combustion chamber are supplied, the regulations described are substantially the same.

In particular, when different fuels are supplied into the first and second combustion chamber 3a, 3b, the C2+ and/or $H_2$ content of both fuels must be monitored and the FGR must be regulated on the basis of the fuel causing a greater flashback risk (also in connection with the features of the different combustion chambers 3a, 3b).

The present invention also refers to a method for operating a power plant. The method includes online regulating the recirculated flow 12 mass flow rate in relation to the C2+ and/or $H_2$ content of the fuel 27 (preferably natural gas).

In particular, the fuel C2+ and/or $H_2$ content is continuously online measured (for example by chromatography) and the recirculated flow 12 mass flow rate is correspondingly continuously online regulated.

Advantageously, the recirculated flow 12 mass flow rate is increased when the fuel C2+ and/or $H_2$ content increases and is decreased when the fuel C2+ and/or $H_2$ content decreases.

In addition, together with the recirculated flow 12 mass flow rate, the temperature at the combustion chamber outlet can also be regulated; for example the temperature may be increased and/or kept constant when the fuel C2+ and/or $H_2$ content varies.

Preferably, when the gas turbine is a reheat gas turbine and thus it has a compressor 2, a first combustion chamber 3a, a high pressure turbine 4a, a second combustion chamber 3b fed with the partially expanded flue gases still containing oxygen from the first turbine 4a and a low pressure turbine 4b, the recirculated flow 12 mass flow rate is regulated in relation to the C2+ and/or $H_2$ content of the fuel supplied into the second combustion chamber 3b.

In addition, when the flame temperature must be regulated and in particular reduced, the flame temperature of the first combustion chamber is preferably reduced instead of the flame temperature of the second combustion chamber; this allows a lower power reduction.

It should be understood that the features described may be independently provided from one another.

In practice the materials used and the dimensions can be chosen at will according to requirements and to the state of the art.

REFERENCE NUMBERS 1 gas turbine unit
2 compressor of 1
3, 3a, 3b combustion chamber of 1
4, 4a, 4b turbine of 1
6 mixture
7 fresh air
8 flue gases
9 boiler of 10
10 steam turbine unit
11 diverter
12 recirculated flow
13 discharged flow
14 cooler
15 fan
16 mixer
19 cooler
20 fan
21 $CO_2$ capture unit
22 discharge into atmosphere
24 $CO_2$ storing
25 mixing devices
26 combustion device
27 fuel
28 electric generator
30 control unit
31 sensor
33 look-up tables
FCC fuel C2+ content
FGR flue gas recirculation ratio

What is claimed is:

1. A method for operating a power plant including a gas turbine unit (1) adapted to feed flue gases (8) into a diverter (11) where the flue gases are divided into a recirculated flow (12) and a discharged flow (13), the recirculated flow (12) is fed into a mixer (16) together with fresh air (7) to form a mixture (6) that is fed to a compressor of the gas turbine unit (1), the gas turbine unit (1) having at least one combustion chamber (3, 3a, 3b) downstream of the compressor where a fuel (27) is burnt together with the mixture (6), the method comprising:
  providing a C2+ or C2+ and $H_2$ content of the fuel to a control unit;
  determining a flue gas recirculation ratio for the fuel based on the provided C2+ or C2+ and $H_2$ content; and
  regulating online a mass flow rate of the recirculated flow (12), which is fed to the mixer, using the flue gas recirculation ratio,
  wherein the power plant includes a cooler configured to produce water condensate located downstream of the diverter, and the flue gas recirculation ration is a ratio between the recirculated flow of flue gases downstream of the cooler and the flue gases at an outlet of the gas turbine.

2. The method according to claim 1, wherein the recirculated flow (12) mass flow rate is increased when the fuel (27) C2+ or C2+ and $H_2$ content increases and is decreased when the fuel (27) C2+ or C2+ and $H_2$ content decreases.

3. The method according to claim 1, wherein, together with the recirculated flow (12) mass flow rate, a temperature of the flue gas at a combustion chamber outlet is also regulated.

4. The method according to claim 3, wherein the temperature at the combustion chamber outlet is increased and/or kept constant.

5. The method according to claim 1, wherein the at least one combustion chamber includes a first combustion chamber (3a) and, downstream of the first combustion chamber: a high pressure turbine (4a), a second combustion chamber (3b) that is fed with flue gases partially expanded in the high pressure turbine (4a), and a low pressure turbine (4b) that is fed with flue gases generated in the second combustion chamber (3b), and
  wherein the recirculated flow (12) mass flow rate is regulated in relation to a C2+ or C2+ and H2 content of fuel supplied into the second combustion chamber (3b).

6. The method according to claim 1, wherein before the flue gases (8) are divided by the diverter (11), they are supplied into a boiler (9) of a steam turbine unit (10).

7. The method according to claim 1, wherein the discharged flow (13) is fed into a $CO_2$ capture unit (21).

8. The method according to claim 1, wherein the fuel (27) is natural gas.

9. A power plant comprising:
  a gas turbine unit (1) adapted to feed flue gases (8) into a diverter (11) where the flue gases are divided into a recirculated flow (12) and a discharged flow (13), the recirculated flow (12) is fed into a mixer (16) together with fresh air (7) to form a mixture (6) that is fed to a compressor of the gas turbine unit (1), the gas turbine unit (1) comprises at least one combustion chamber (3, 3a, 3b) downstream of the compressor where a fuel (27) is burnt together with the mixture (6); and
  a control unit (30) that is supplied with information regarding a C2+ or C2+ and H2 content of the fuel and is connected to at least the diverter (11) to drive the diverter and online regulate a mass flow rate of the recirculated flow (12), which is fed to the mixer, in relation to the fuel (27) C2+ or C2+ and $H_2$ content;
  a cooler configured to produce water condensate located downstream of the diverter,
  wherein the control unit (30) includes a computer implementing look-up tables (33) associating the fuel C2+ or C2+ and $H_2$ content (FCC) to a respective flue gas recirculation ratio (FGR) and regulates the recirculated flow based on the respective FGR, and
  wherein the flue gas recirculation ratio is a ratio between the recirculated flow of flue gases downstream of the cooler and the flue gases at an outlet of the gas turbine.

10. The power plant according to claim 9, wherein the at least one combustion chamber includes a first combustion chamber (3a) and, downstream of the first combustion chamber: a high pressure turbine (4a), a second combustion chamber (3b) that is fed with flue gases partially expanded in the high pressure turbine (4a), and a low pressure turbine (4b) that is fed with flue gases generated in the second combustion chamber (3b), and
  wherein the control unit (30) regulates the recirculated flow (12) mass flow rate in relation to the C2+ or C2+ and $H_2$ content of the fuel (27) supplied into the second combustion chamber (3b).

11. The power plant according to claim 9, wherein flue gases discharged from the gas turbine unit (1) are supplied into a boiler (9) of a stream turbine unit (10).

12. The power plant according to claim 9, wherein the discharged flow (13) is supplied into a $CO_2$ capture unit (21).

13. The method according to claim 1, wherein the fuel (27) C2+ or C2+ and $H_2$ content is continuously online measured and the recirculated flow (12) mass flow rate is correspondingly continuously online regulated.

14. The power plant according to claim 9, comprising:
  sensors (31) for continuously online measuring the fuel (27) C2+ or C2+ and $H_2$ content connected to the control unit (30), wherein the control unit (30) correspondingly continuously online regulate the recirculated flow (12) mass flow rate.

15. The method according to claim 1, wherein the mixer is upstream of the gas turbine unit.

16. The power plant according to claim 9, wherein the mixer is upstream of the gas turbine unit.

* * * * *